United States Patent
Moser et al.

(10) Patent No.: US 6,408,621 B1
(45) Date of Patent: Jun. 25, 2002

(54) FLUID COUPLING ASSEMBLY

(75) Inventors: George Moser, Mason; Gordon Sommer, Plymouth, both of MI (US)

(73) Assignee: Engineered Dynamics Corporation, Plymouth, MI (US)

(*) Notice: Subject to any disclaimer, the term of this patent is extended or adjusted under 35 U.S.C. 154(b) by 0 days.

(21) Appl. No.: 09/659,684

(22) Filed: Sep. 11, 2000

(51) Int. Cl.⁷ ............................................. F16D 33/00
(52) U.S. Cl. ............................. 60/337; 60/358; 60/366
(58) Field of Search ........................... 60/358, 366, 337

(56) References Cited

U.S. PATENT DOCUMENTS

| | | |
|---|---|---|
| 923,565 A | 6/1909 | Newcomb |
| 1,238,447 A | 8/1917 | Severy |
| 2,714,946 A | 8/1955 | Tenot et al. |
| 2,949,046 A | 8/1960 | Critelli |
| 2,988,188 A | 6/1961 | Tauschek |
| 3,019,875 A | 2/1962 | Fowler |
| RE25,481 E | 11/1963 | Weir |
| 3,179,221 A | 4/1965 | Weir |
| 3,268,041 A | 8/1966 | Roper |
| 3,380,565 A | 4/1968 | Wilkinson |
| 3,677,004 A * | 7/1972 | Muller et al. ............. 60/358 |
| 3,716,995 A * | 2/1973 | Peter et al. ............... 60/358 |
| 3,861,503 A | 1/1975 | Nash |
| 3,893,555 A | 7/1975 | Elmer |
| 3,955,365 A * | 5/1976 | Arao ........................ 60/358 |
| 4,060,158 A | 11/1977 | Kikuchi |
| 4,116,318 A | 9/1978 | Crisenbury et al. |
| 4,169,527 A | 10/1979 | Bopp |
| 4,203,289 A * | 5/1980 | Muschelknautz ........ 60/358 |
| 4,238,015 A | 12/1980 | Schmida |
| 4,282,960 A | 8/1981 | Glasson et al. |
| 4,305,491 A | 12/1981 | Rohrer |
| 4,310,084 A | 1/1982 | Nonnenmann |
| 4,350,011 A * | 9/1982 | Rogner et al. ............ 60/358 |
| 4,351,425 A | 9/1982 | Bopp |
| 4,351,426 A | 9/1982 | Bopp |
| 4,405,039 A | 9/1983 | Hauser |
| 4,488,628 A | 12/1984 | Kluna et al. |
| 4,591,037 A | 5/1986 | Bopp |
| 4,728,159 A | 3/1988 | Solomon et al. |
| 4,874,072 A | 10/1989 | Mohan et al. |
| 4,898,266 A | 2/1990 | Garrett et al. |
| 4,898,267 A | 2/1990 | Garrett et al. |
| 4,899,860 A | 2/1990 | Diederich |

(List continued on next page.)

FOREIGN PATENT DOCUMENTS

JP 404157249 A * 5/1992 ................. 60/366

*Primary Examiner*—F. Daniel Lopez
*Assistant Examiner*—Igor Kershteyn
(74) *Attorney, Agent, or Firm*—Harness, Dickey & Pierce, PLC

(57) ABSTRACT

A fluid coupling assembly 10 is provided and includes a stationary housing 12, which h forms a first chamber 14; an inner housing or output member 16 which is rotatably disposed within chamber 14 and which forms a second chamber 18; and a rotor or drive member 20, which is rotatably disposed within chamber 18. An amount of fluid is contained within chambers 14 and 18 and is used to transmit torque between the rotor 20 and the inner housing 16. Assembly 10 further includes a pump assembly 24 which is effective to circulate the fluid through assembly 10. An electrical valve 30 is coupled to housing 12 and is effective to selectively control the flow of fluid into chambers 14 and 18. A water jacket 32 within housing 12 is used to cool the fluid flowing through assembly 10. Assembly 10 selectively transmits torque from rotor 20 to housing 16, thereby driving the rotation of a fan assembly 34. Valve 30 is selectively actuated according to a predetermined algorithm or program which controls the flow of fluid into rotor 20 and cavity 18, thereby controlling the torque and rotational speed transmitted to housing 16 from rotor 20.

18 Claims, 2 Drawing Sheets

U.S. PATENT DOCUMENTS

| | | |
|---|---|---|
| 4,938,331 A | 7/1990 | Ohmi et al. |
| 4,972,931 A | 11/1990 | Masuda et al. |
| 5,030,865 A | 7/1991 | Rockey et al. |
| 5,042,629 A | 8/1991 | Elmer |
| 5,046,326 A * | 9/1991 | Havermann et al. .......... 60/358 |
| 5,117,955 A | 6/1992 | Kikuchi |
| 5,319,949 A * | 6/1994 | Long et al. .................... 60/358 |
| 5,526,912 A | 6/1996 | Gassmann |
| 5,558,192 A | 9/1996 | Muhlbach et al. |
| 5,575,368 A | 11/1996 | Kikuchi et al. |
| 5,584,371 A | 12/1996 | Kelledes et al. |
| 5,740,766 A | 4/1998 | Moser |
| 5,791,876 A | 8/1998 | Moser |
| 5,931,273 A | 8/1999 | Moser |
| 5,960,918 A | 10/1999 | Moser et al. |
| 5,975,265 A | 11/1999 | Moser |
| 6,032,772 A | 3/2000 | Moser |
| 6,065,667 A | 5/2000 | Sasaki |
| 6,196,551 B1 * | 3/2001 | Zellers ....................... 60/366 |
| 6,220,416 B1 | 4/2001 | Katoh et al. |

* cited by examiner

FLUID COUPLING ASSEMBLY

FIELD OF THE INVENTION

This invention relates to a fluid coupling assembly and, more particularly, to a fluid coupling assembly which utilizes a stationary housing, a gear pump, an electronic actuator and a rotor design with internal fluid passages to achieve improved performance, speed control and cooling characteristics.

BACKGROUND OF THE INVENTION

Fluid coupling assemblies utilize fluid flow forces to selectively transfer torque and power between rotating devices. Fluid coupling assemblies typically include a housing having an interior chamber containing an amount of fluid, and a rotor or drive member which selectively rotates within the interior chamber. The fluid acts in shear with the rotating drive member to transmit torque to the housing, thereby transferring torque between the drive member and housing.

Fluid couplings are widely used in automotive applications to selectively engage and disengage rotating devices, such as an engine cooling fan or other device, as well as to limit the maximum rotational speed of the fan or device. One drawback of such fluid couplings is that they are extremely sensitive to the amount of fluid or oil that is contained within the housing and that is used to transfer torque from the rotor to the housing. Due to this high sensitivity, if even a very small amount of fluid escapes from the housing, the fluid coupling will malfunction or become inoperable. Furthermore, the fluid flow or circulation within these prior fluid couplings is relatively low and causes these fluid couplings to operate at relatively high temperatures. As a result, these prior fluid couplings must be manufactured from relatively expensive heat conductive material, such as die cast aluminum, thereby undesirably increasing manufacturing cost and complexity. Moreover, the speed control response of these prior fluid couplings is relatively slow due to the relatively low oil flow within the fluid coupling.

There is therefore, a need for a new and improved fluid coupling assembly which overcomes the previously delineated drawbacks of these prior fluid coupling assemblies.

SUMMARY OF THE INVENTION

It is a first object of the invention to provide a fluid coupling assembly which overcomes at least some of the previously delineated drawbacks of prior fluid coupling assemblies.

It is a second object of the invention to provide a fluid coupling assembly which utilizes an internal gear pump or other fluid flow device to achieve a relatively high volume of oil flow within the device, thereby allowing the device to be cooled relatively easily and quickly.

It is a third object of the invention to provide a fluid coupling assembly which utilizes a stationary housing having a water jacket to provide cooling to the assembly.

It is a fourth object of the invention to provide a fluid coupling assembly which is adapted for use with an automotive fan assembly or other device and which utilizes a hollow rotor design with internal fluid passages to achieve improved speed control performance relative to prior fluid couplings.

It is a fifth object of the invention to provide a fluid coupling assembly which is relatively insensitive to the amount of fluid or oil within the assembly and which includes a removable plug or member which allows the assembly to be selectively refilled.

According to a first aspect of the present invention, a fluid coupling assembly is provided and includes a stationary housing which forms a first chamber containing an amount of fluid; a rotatable housing which is disposed within the first chamber and which forms a second chamber which is in fluid communication with the first chamber; a rotor which is disposed within the second chamber and which is selectively rotatable within the second chamber; and a pump assembly which is effective to communicate the amount of fluid from the first chamber to the second chamber, thereby causing the amount of fluid to transmit torque from the rotating rotor to the rotatable housing.

According to a second aspect of the present invention, a fluid coupling assembly is provided and includes a stationary housing which forms a first chamber; a rotatable housing which is disposed within the first chamber and which forms a second chamber; a hollow rotor which is rotatably disposed within the second chamber and which includes a channel which is selectively and fluidly coupled to the first chamber and the second chamber; an amount of fluid which is contained within the first and second chambers and the channel, and which is effective to selectively transfer torque from the hollow rotor to the rotatable housing; and a selectively actuatable valve assembly which is effective to control the amount of fluid which is communicated from the first chamber to the channel and the second chamber, thereby controlling the amount of fluid within the second chamber and the torque transmitted from the rotor to the rotatable housing.

These and other features, aspects and advantages of the invention will become apparent by reading the following specification and by reference to the following drawings.

DETAILED DESCRIPTION OF THE PREFERRED EMBODIMENT OF THE INVENTION

Figure 1:
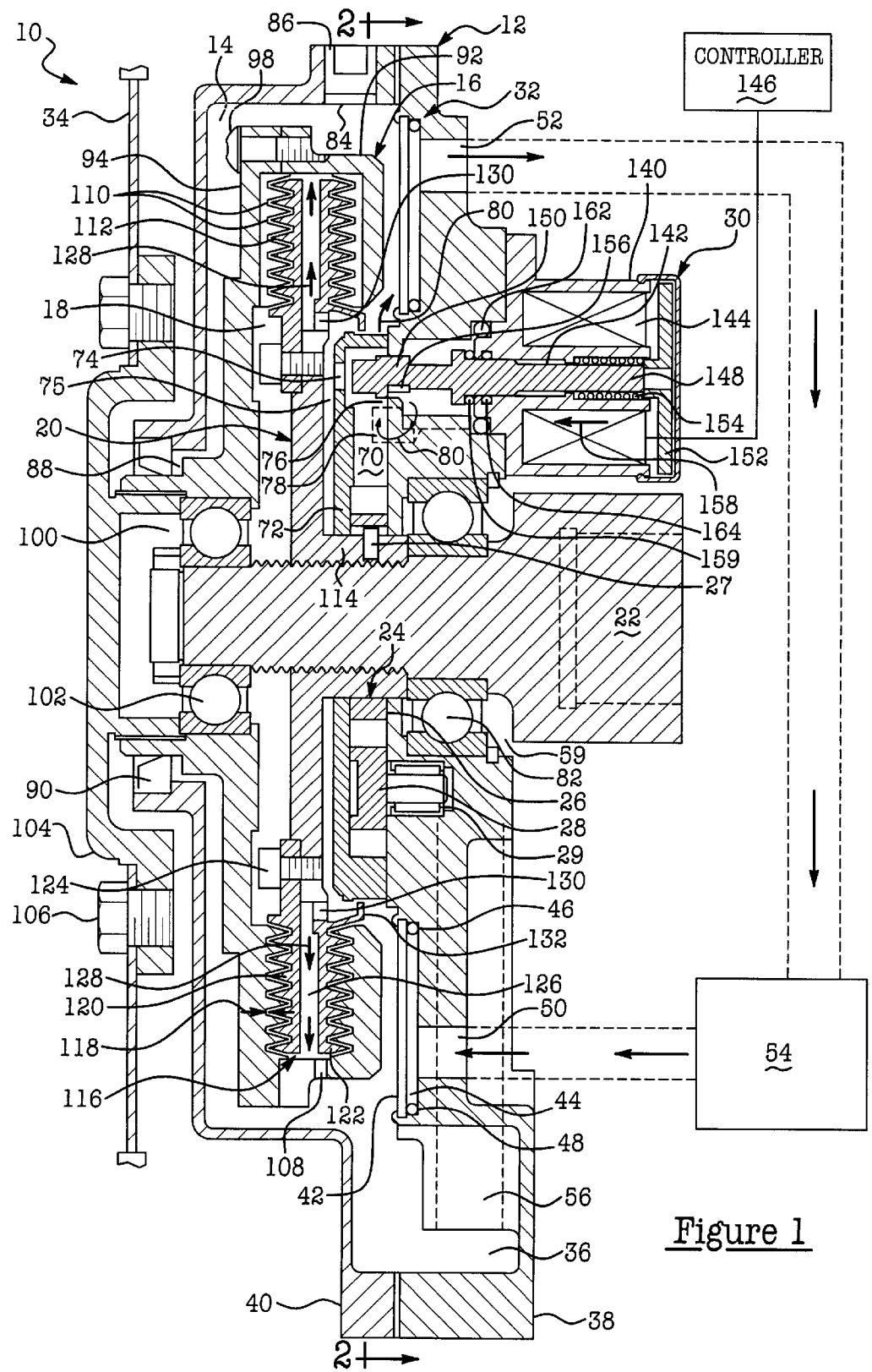
FIG. 1 is a longitudinal cross sectional view of a fluid coupling assembly which is made in accordance with the teachings of the preferred embodiment of the invention.
Figure 2:
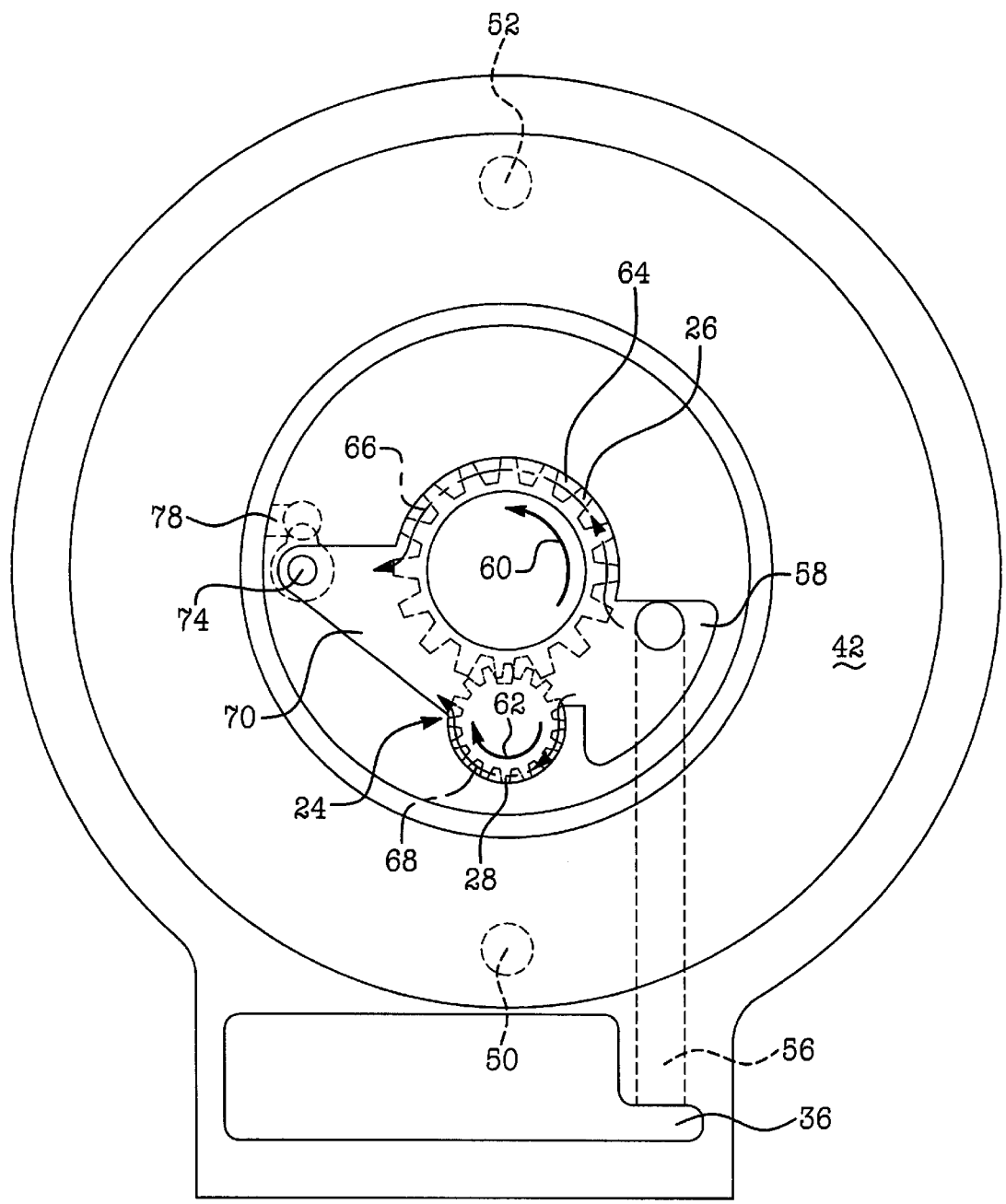
FIG. 2 is a cross sectional view of the fluid coupling assembly shown in FIG. 1 and taken along view line 2—2.

Referring now to FIG. 1, there is shown a fluid coupling assembly 10 which is made in accordance with the teachings of the preferred embodiment of the invention, and which is adapted for use in combination with a vehicle of the type having engine which operatively provides an input torque to assembly 10 and a fan assembly 34 which operatively receives an output torque from assembly 10. While the following discussion relates to the use of fluid coupling assembly 10 with a vehicle fan 34, it should be appreciated that assembly 10 may be used in virtually any other apparatus, device, or assembly in which torque is desired to be transferred between two rotating devices in a torque or speed limiting manner.

Fluid coupling assembly 10 includes a stationary or outer housing or member 12 which forms a first internal cavity or chamber 14; an inner housing or output member 16, which is rotatably disposed within chamber 14 and which forms an inner cavity or chamber 18; and a rotor or drive member 20, which is rotatably disposed within inner chamber 18. An amount of fluid or oil is contained within chambers 14 and 18 and is used to transmit torque between the rotor 20 and the inner housing 16. Housing 16 is attached to fan assembly 34, and rotor 20 is fixedly coupled to an input shaft or member 22 which selectively receives rotational torque from a rotating member, such as the vehicle's crankshaft or water pump (e.g., by use of a conventional accessory drive belt).

Assembly 10 further includes a pump assembly 24, which in the preferred embodiment is a gear pump assembly. Gear pump assembly 24 includes a first gear 26, which is operatively coupled to rotor 20 (e.g., by use of a conventional pin 27), and a second gear 28, which is rotatably coupled to housing 12 (e.g., by use of conventional needle bearings 29). As described more fully and completely below, gear pump 24 is effective to circulate the oil or fluid through assembly 10. An electrical valve 30 is coupled to housing 12 and is effective to selectively control the flow of fluid into hollow rotor 20 and into chambers 14 an d 18. Assembly 10 further includes a water jacket 32 which is formed within housing 12 and which cools assembly 10.

Assembly 10 selectively transmits torque from rotor 20 to housing 16, thereby driving the rotation of fan assembly 34. As discussed more fully and completely below, valve 30 is selectively actuated according to a predetermined algorithm or program which controls the flow of fluid into rotor 20 and cavity 18, thereby controlling the torque and rotational speed transmitted to housing 16 from rotor 20 and maintaining the fan 34 at a certain desirable speed or range of speeds.

In the preferred embodiment, housing 12 is generally disc-shaped and includes two halves or portions 38, 40 which are coupled together in a conventional manner (e.g., by use of a conventional adhesive material or by the use of conventional fasteners). Housing 12 is preferably made from a relatively strong, durable and rigid material such as a metal or composite material.

Portion 38 includes water jacket 32, which includes a relatively thin and thermally conductive (e.g., aluminum) plate or member 42. Plate 42 is coupled to housing portion 38 by use of a conventional crimping technique. A generally ring-shaped conduit or passage 44 is formed between plate 42 and housing portion 38. Water or other coolant is selectively communicated through passage 44 and removes heat from plate 42 and the fluid or oil circulating within assembly 10. A pair of o-rings or seals 46, 48 are disposed between plate 42 and housing portion 38 and form a water-tight seal which prevents water or other coolant within conduit 44 from escaping into chamber 14. Portion 38 further includes a pair of apertures 50, 52 which fluidly communicate with conduit 44. Apertures 50, 52 are communicatively connected to a source of water or other coolant 54 which may form a portion of the engine's or vehicle's cooling system or radiator. As shown, coolant flows into conduit 44 through aperture 50 and out of conduit 44 through aperture 52, thereby cooling assembly 10.

Interior cavity 14 of housing 12 includes a sump or drainage portion 36, which is formed in the lower portion of housing 12. Fluid or oil circulating within assembly 10 drains into sump 36 where it is subsequently recirculated. Particularly, an integrally formed conduit or passage 56 connects sump portion 36 to a gear pump housing portion 72, and more particularly to the intake cavity 58 of housing portion 72. The rotation of gears 26 and 28 in the directions of arrows 60, 62 draws fluid from sump portion 36 into intake cavity 58, and causes fluid within intake cavity 58 to flow around the periphery of the pump chamber 64 in the directions of arrows 66, 68 and into pump discharge chamber 70. Discharge chamber 70 includes a first aperture 74 which is fluidly connected to the gap 75 that is formed between rotor 20 and pump housing portion 72. Aperture 74 allows fluid to be channeled into gap 75 and hollow rotor 20 when valve 30 is in an "open" or unenergized state (e.g., when valve 30 is in the position shown in FIG. 1). Discharge chamber 70 further includes a second aperture 76 which is fluidly connected to conduits or passages 78 which allow fluid to be channeled into chamber 14 when valve 30 is in a "closed" or energized state. Conduits or passages 78 are integrally formed within housing portion 38 and allow fluid to flow from aperture 76 into chamber 14 in the direction of arrows 80. In alternate embodiments, gear pump assembly 24 may be replaced with other conventional fluid pump assemblies such as a gerotor, ramp or piston type pump assembly.

Housing portion 38 further includes a centrally disposed aperture 59 through which shaft 22 extends. A conventional bearing assembly 82 (e.g., a ball bearing assembly) is attached to the inner surface of housing portion 38 which defines aperture 59 and to the outer surface of shaft 22. Bearing assembly 82 allows shaft 22 to rotate with respect to housing 12, while concomitantly and radially supporting housing 12 relative to shaft 22.

Housing portion 40 includes a fill aperture or hole 84 which is integrally formed within the top surface of housing portion 40. A plug member 86 is selectively inserted and removed from aperture 84 and allows oil or fluid to be selectively added to cavity 14. In one non-limiting embodiment, plug member 86 is threaded. Housing portion 40 further includes a centrally disposed aperture 88 through which housing 16 extends. A conventional lip seal 90 is disposed between the outer surface of housing 16 and the inner surface of housing portion 40 which defines aperture 88, and is effective to prevent fluid within chamber 14 from escaping between housing portion 40 and the outer surface of housing 16.

In the preferred embodiment, inner or rotatable housing 16 is generally disc-shaped and includes two halves or portions 92, 94 which are coupled together in a conventional manner (e.g., by use of conventional fasteners 98). Housing 16 is preferably made from a relatively strong, durable and rigid material such as a metal, polymeric or composite material. Hub portion 94 includes an aperture 100 through which shaft 22 extends. A conventional sealed bearing assembly 102 (e.g., a ball bearing assembly) is attached to the inner surface of hub portion 94 that defines aperture 100 and to the outer surface of shaft 22. Bearing assembly 102 allows shaft 22 to rotate with respect to housing 16, while concomitantly and radially supporting housing 16 relative to shaft 22. Sealed bearing assembly 102 is preferably press-fitted to the inner annular surface of hub portion 94 and to the outer annular surface of shaft 22, effective to prevent fluid oil from chamber 18 from flowing "around" or through bearing assembly 102. A fan attachment member or portion 104 is fixedly attached to housing portion 94. Fan assembly 34 is attached t o portion 104 in a conventional manner, such as by use of conventional fasteners 106.

Housing 16 includes several opposing internal grooves 110 which cooperate with ridges 112 on rotor 20 to increase the amount of surface area for fluid to contact. Housing 16 further includes several integrally formed passages or apertures 108 which are disposed around the periphery of housing 16 and which provide fluid communication between chamber 18 and chamber 14.

Rotor 20 selectively rotates within chamber 18 and includes an attachment or hub portion 114 which is fixedly coupled to input shaft 22, and a generally disc-shaped outer hollow portion 116, which includes ridges 112. Disc-shaped portion 116 conforms to the shape of chamber 18, such that a small uniform gap 118 exists between the outer surface of portion 116 and the inner surface of housing 16. In the preferred embodiment, hollow portion 116 is formed from two portions or halves 120, 122 which are coupled together by use of conventional fasteners 124. A central channel 126 is formed between halves 120 and 122 and allows fluid to be quickly transmitted to the outside of rotor 20 and into gap 118 (e.g., in the directions of arrows 128), thereby transmitting torque from rotor 20 to housing 16. Half 122 includes several apertures 130 which fluidly communicate with gap 75 and allow fluid from discharge chamber 70 to flow into channel 126. Half 122 further includes a flange portion 132 which substantially prevents fluid within gap 75 from escaping into chamber 14. In other alternate embodiments, portion 116 and housing 16 h have different conforming shapes. For example and without limitation, portion 116 and housing 16 may include differently shaped conforming grooves/ridges which further increase the amount of surface area for fluid to contact.

Valve 30 has a generally round top portion 140 which is fixedly coupled to portion n 38 of housing 12 in a conventional manner, and which forms an interior cavity 142. An electrical coil 144 is disposed within portion 140 and is communicatively coupled to a controller 146 which may comprise a portion of a vehicle engine control module. A spool member 148 is movably disposed within the interior cavity 142 and includes a body portion 150 and an armature portion 152. Valve 30 further includes a biasing spring 154 which engages the armature 152 and forces the spool member 148 to remain in the position shown in FIG. 1 when energy is not supplied to the coil 144. In this first position, the body portion 150 substantially covers aperture 76 and prevents fluid from flowing into conduits 80 and into chamber 14.

Body portion 150 further includes a notch 156. When the coil 144 is energized, by the creation of a signal from controller 146, electromagnetic energy is generated which causes the spool member 148 to move in the direction of arrow 158. This movement causes the spool member 148 to assume a second position in which the notch 156 communicates with the discharge chamber 70 and allows fluid to flow from chamber 70 into conduits 78. Additionally, in this second position, body portion 150 substantially covers aperture 74, thereby preventing fluid from flowing into hollow rotor 20 and chamber 18. An o-ring 159 is disposed between spool 148 and body portion 150, and is effective to "muffle" or eliminate any noise or vibration which could be generated by the contact of spool 148 against body portion 150 during the actuation of valve 30. Additionally, o-rings 162 and 164 are respectively disposed around and within body portion 150 and are effective to prevent fluid from escaping from housing 12 and/or into body portion 150.

In operation, the rotation of the engine's crankshaft drives input shaft 22 through an accessory drive belt. The rotation of shaft 22 causes rotor 20 to rotate at the same speed within chamber 18. Gear 26 rotates with rotor 20 and causes gear 28 to rotate, thereby drawing fluid from sump 36 and intake chamber 58 into discharge chamber 70. The fluid then flows into gap 75 and hollow rotor 20 (i.e., into channel 126 within hollow rotor 20 in the directions of arrows 128). The fluid is then forced out into chamber 18, and more particularly, into the gap 118. Additionally, fluid already within chamber 18 begins to centrifugally flow outward toward the periphery of chamber 18 and into gap 118. The fluid generates a shearing force between rotor 20 and housing 16, thereby driving the rotation of housing 16, which in turn rotatably drives fan 34.

As the speed of input shaft 22 and rotor 20 increases, the flow of fluid generated by pump 24 increases, thereby increasing the amount of fluid in chamber 18. As a result, the shearing force of the fluid concomitantly increases, thereby increasing the rotational speed of housing 16 and fan 36. Once the speed of rotor 20 exceeds a certain level (which may be determined based upon various calibratable parameters) controller 146 sends a signal to valve 30, effective to energize coil 144, thereby causing spool 148 to move in the direction of arrow 158 and to close aperture 74. When valve 30 is in this "closed" position, the amount of fluid within chamber 18 decreases, as the flow of fluid out of chamber 18 through apertures 108 exceeds the flow of fluid into chamber 18. Particularly, when the valve 30 is in the closed position, aperture 74 is blocked and fluid from discharge chamber 70 flows through conduits 78 directly into chamber 14, thereby bypassing chamber 18. As a result, the amount of torque transferred to housing 16 and the rotational speed of housing 16 and fan 34 are reduced. In this manner, the present invention controls or limits the torque or rotational speed transmitted from the rotor 20 to the housing 16.

In the preferred embodiment, controller 146 monitors various vehicle operating conditions such as engine speed, load, temperature and fan speed and uses a predetermined algorithm or program to control the actuation of valve 30. By moving the spool 148 "up and down" (i.e., by energizing the coil 144 for certain portions of an interval of time), a desired and programmed amount of fluid may be circulated within chamber 18 during this interval of time, thereby allowing for a programmed amount of torque and/or speed transfer between rotor 20 and housing 16. The amount of fluid communicated to chamber 18 is therefore directly proportional to the amount of time that the signal emanating from controller 146 is activated. By varying the amount of time the signal is active and the torque and/or speed transmitted to fan 34 may be controlled.

The hollow design of rotor 20 allows fluid to be channeled directly to the periphery of chamber 18, effective to quickly coat the driving surfaces 110, 112 of housing 16 and rotor 20, thereby increasing the response time of assembly 10 relative to prior fluid coupling assemblies. Moreover, the high volume fluid flow created by gear pump 24 and the integral water jacket 32 allows heat to be quickly dissipated or removed from the fluid within assembly 10, thereby substantially lowering the operating temperature of assembly 10. This significantly lower operating temperature allows rotor 20 and housing 16 to be manufactured from plastic type materials in certain embodiments of the invention. Additionally, the stationary housing 12 which acts as a refillable source of fluid, allows the assembly 10 to be relatively insensitive to the amount of fluid within the assembly. By selectively operating valve 30, the amount of fluid flowing into chamber 18 and the amount of fluid flowing out of chamber 18 can be precisely controlled, thereby allowing the overall amount of fluid within chamber 14 to vary without effecting the performance of assembly 10. Another advantage provided by the present invention, is that the electronically actuated valve 30 is disposed at the back of the assembly 10 (i.e., on the side opposite fan 34), thereby simplifying the routing of electrical wires within the engine.

The foregoing advantages provided by assembly 10 when used in combination with a fan assembly also apply to many other devices that may be used with the present invention. For example and without limitation, assembly 10 may be used in combination with air conditioning compressors, steering pumps, water pumps, air pumps, alternators, oil pumps, turbochargers, turbines, fuel injection pumps, transmission components, machine tool components, and other automotive and industrial devices.

It is to be understood that the invention is not to be limited to the exact construction and/or method which has been illustrated and discussed above, but that various changes and/or modifications may be made without departing from the spirit and the scope of the invention.

What is claimed is:

1. A fluid coupling assembly comprising:
    a stationary housing which forms a first chamber containing an amount of fluid;
    a rotatable housing which is disposed within said first chamber and which forms a second chamber which is in fluid communication with said first chamber;
    a rotor which is disposed within said second chamber and which is selectively rotatable within said second chamber; and
    a pump assembly which is effective to communicate said amount of fluid from said first chamber to said second chamber, thereby causing said amount of fluid to transmit torque from said rotating rotor to said rotatable housing;
    wherein said rotor is substantially hollow and includes a channel which is effective to communicate at least a portion of said amount of fluid to said second chamber.

2. The fluid coupling assembly of claim 1 wherein said pump assembly comprises a gear pump.

3. The fluid coupling assembly of claim 1 wherein said pump assembly comprises a gerotor.

4. The fluid coupling assembly of claim 1 wherein said pump assembly comprises a piston type pump.

5. The fluid coupling assembly of claim 1 further comprising:
    a selectively actuatable valve operatively disposed between said pump assembly and said second chamber and effective to selectively prevent said pump assembly from communicating fluid into said second chamber.

6. The fluid coupling assembly of claim 5 wherein said valve assembly comprises an electronically actuated valve assembly.

7. The fluid coupling assembly of claim 1 further comprising a water jacket formed with said stationary housing and effective to receive an amount of water and cool said amount of fluid.

8. The fluid coupling assembly of claim 1 wherein said rotatable housing is coupled to and selectively drives a fan.

9. The fluid coupling assembly of claim 1 wherein said rotatable housing is coupled to and selectively drives one of an alternator, an air conditioning compressor, a water pump, a steering pump, an air pump, an oil pump, a turbocharger, a turbine, a fuel injection pump, a transmission component, and a machine tool component.

10. A fluid coupling assembly comprising:
    a stationary housing forming a first chamber;
    a rotatable housing disposed within said first chamber and forming a second chamber;
    a hollow rotor rotatably disposed within said second chamber and including a channel selectively and fluidly coupled to said first chamber and said second chamber;
    an amount of fluid contained within said first and second chambers and said channel, and effective to control the amount of fluid communicated from said first chamber to said channel and said second chamber, thereby controlling the amount of fluid within said second chamber and the torque transmitted from said rotor to said rotatable housing.

11. The fluid coupling assembly of claim 10 further comprising:
    a pump assembly which is effective to cause said amount of fluid to flow from said first chamber into said channel and said second chamber.

12. The fluid coupling assembly of claim 11 wherein said pump assembly is a gear pump.

13. The fluid coupling assembly of claim 10 wherein said selectively actuatable valve assembly is an electronic valve assembly.

14. The fluid coupling assembly of claim 2 wherein said stationary housing includes a removable plug which allows fluid to be selectively inserted into said first chamber.

15. The fluid coupling assembly of claim 10 wherein said rotatable housing includes a plurality of apertures which fluidly connect said second chamber to said first chamber.

16. A fluid coupling assembly comprising:
    a stationary housing which forms a first chamber;
    a rotatable housing which is disposed within said first chamber and which forms a second chamber which is in fluid communication with said first chamber;
    a rotor which is disposed within said second chamber and which is selectively rotatable within said second chamber;
    an amount of fluid which is contained within said first and second chambers, and which is effective to selectively transfer torque from said rotor to said rotatable housing; and
    a water jacket which is connected to an engine cooling system, is formed within said stationary housing, and is effective to receive an amount of water and to remove heat from said amount of fluid.

17. The fluid coupling assembly of claim 16 further comprising:
    a pump which is effective to communicate said amount of fluid from said first chamber to said second chamber, thereby causing said amount of fluid to transmit torque from said rotating rotor to said rotatable housing.

18. A fluid coupling assembly comprising:
    a stationary ho using which forms a first chamber containing an amount of fluid;
    a rotatable housing which is disposed within said first chamber and which forms a second chamber which is in fluid communication with said first chamber;
    a rotor which is disposed within said second chamber and which is selectively rotatable within said s second chamber; and
    a piston type pump assembly which is effective to communicate said amount of fluid from said first chamber to said second chamber, thereby causing said amount of fluid to transmit torque from said rotating rotor to said rotatable housing;
    wherein said rotor is substantially hollow and includes a channel which is effective to communicate at least a portion of said amount of fluid to said second chamber.

* * * * *

UNITED STATES PATENT AND TRADEMARK OFFICE
CERTIFICATE OF CORRECTION

PATENT NO.    : 6,408,621 B1
DATED         : June 25, 2002
INVENTOR(S)   : George Moser et al.

It is certified that error appears in the above-identified patent and that said Letters Patent is hereby corrected as shown below:

<u>Title page,</u>
Item [57], ABSTRACT,
Line 2, delete "h"

<u>Column 5,</u>
Line 18, delete "h"
Line 24, delete "n"

<u>Column 8,</u>
Line 17, "claim 2" should be -- claim 10 --
Line 48, "ho using" should be -- housing --
Line 55, delete "s"

Signed and Sealed this

Sixth Day of May, 2003

JAMES E. ROGAN
*Director of the United States Patent and Trademark Office*